(12) United States Patent
Murayama et al.

(10) Patent No.: US 7,142,886 B2
(45) Date of Patent: Nov. 28, 2006

(54) ELECTRONIC APPARATUS HAVING ANTENNA BOARD FOR RADIO COMMUNICATION

(75) Inventors: Tomomi Murayama, Nishitama-gun (JP); Masataka Tokoro, Tachikawa (JP); Hiroshi Nakamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 441 days.

(21) Appl. No.: 10/798,782

(22) Filed: Mar. 12, 2004

(65) Prior Publication Data

US 2004/0209646 A1 Oct. 21, 2004

(30) Foreign Application Priority Data

Mar. 14, 2003 (JP) .............................. 2003-069149

(51) Int. Cl.
*H04M 1/00* (2006.01)

(52) U.S. Cl. ............................. 455/556.1; 455/556.2; 455/562.1; 455/575.7; 455/575.8; 455/557; 343/702; 361/681

(58) Field of Classification Search .. 455/556.1–556.2, 455/557–559, 66.1, 550.1, 562.1, 566, 575.1, 455/575.3, 575.4, 575.5, 575.7, 575.8, 90.3; 343/702, 700 MS, 700 R, 725–727, 846; 361/683–686, 728, 681
See application file for complete search history.

(56) References Cited

U.S. PATENT DOCUMENTS

| 5,440,449 | A | * | 8/1995 | Scheer ......................... 361/686 |
| 5,517,387 | A | * | 5/1996 | Smith ........................... 361/686 |
| 5,677,698 | A | * | 10/1997 | Snowdon ..................... 343/770 |
| 5,828,341 | A | * | 10/1998 | Delamater ................... 343/702 |
| 6,339,400 | B1 | * | 1/2002 | Flint et al. ................... 343/702 |
| 6,388,627 | B1 | * | 5/2002 | Masaki et al. .............. 343/702 |
| 6,456,499 | B1 | * | 9/2002 | Nakajima et al. ........... 361/752 |
| 6,509,877 | B1 | * | 1/2003 | Masaki ........................ 343/702 |
| 6,600,448 | B1 | * | 7/2003 | Ikegaya et al. ...... 343/700 MS |
| 6,625,013 | B1 | * | 9/2003 | Minaguchi et al. ......... 361/683 |
| 6,642,892 | B1 | * | 11/2003 | Masaki et al. .............. 343/702 |
| 6,654,231 | B1 | * | 11/2003 | Teshima ...................... 361/681 |
| 6,801,171 | B1 | * | 10/2004 | Lien ............................ 343/702 |
| 6,809,690 | B1 | * | 10/2004 | Tao ............................. 343/702 |
| 6,861,986 | B1 | * | 3/2005 | Fang et al. .......... 343/700 MS |
| 6,879,293 | B1 | * | 4/2005 | Sato ............................. 343/702 |
| 6,980,159 | B1 | * | 12/2005 | Sun et al. .................... 343/702 |
| 6,995,718 | B1 | * | 2/2006 | Fang ........................... 343/702 |
| 7,075,782 | B1 | * | 7/2006 | Teshima ...................... 361/681 |
| 2005/0075135 | A1 | * | 4/2005 | Cromer et al. .............. 455/558 |

FOREIGN PATENT DOCUMENTS

| JP | 2000-172376 | 6/2000 |
| JP | 2002-73210 | 3/2002 |
| JP | 2002-196837 | 7/2002 |
| JP | 2002-232220 | 8/2002 |
| JP | 2003-37431 | 2/2003 |

* cited by examiner

*Primary Examiner*—Pablo N. Tran
(74) *Attorney, Agent, or Firm*—Pillbury Winthrop Shaw Pittman, LLP (57) ABSTRACT

An electronic apparatus comprises a display housing supported by a main unit, and a display panel contained in the display housing. The display housing has a supporting wall and an upper wall. The display housing contains an antenna board. The antenna board is interposed between the display panel and the supporting wall, and has an antenna portion which projects outside the display housing and pierces through the upper wall. A nonconductive cover which covers the antenna portion is attached to the upper wall of the display housing.

17 Claims, 7 Drawing Sheets

ELECTRONIC APPARATUS HAVING ANTENNA BOARD FOR RADIO COMMUNICATION

CROSS-REFERENCE TO RELATED APPLICATIONS

This application is based upon and claims the benefit of priority from prior Japanese Patent Application No. 2003-069149, filed Mar. 14, 2003, the entire contents of which are incorporated herein by reference.

BACKGROUND OF THE INVENTION

1. Field of the Invention

This invention relates to an electronic apparatus, such as a portable computer, having a housing containing a built-in antenna board for radio communication, in particular, a structure for mounting an antenna board in a housing.

2. Description of the Related Art

Recent electronic apparatuses have a radio communication function, such as a radio LAN. According to these apparatuses, it is possible to transmit and receive data among plural electronic apparatuses around through wireless communication. Electronic apparatuses having a radio communication function have antennas for radio communication. To achieve stable communication, it is necessary to eliminate factors of obstacles to a radiation field from an antenna as much as possible, and enhance the efficiency of the radiation field.

For example, Jpn. Pat. Appln. KOKAI Pub. No. 2002-73210, Jpn. Pat. Appln. KOKAI Pub. No. 2002-172376, Jpn. Pat. Appln. KOKAI Pub. No. 2003-37431 disclose a conventional portable computer in which an antenna is installed in a display unit. The display unit has a display housing containing a liquid crystal display panel. The antenna is installed inside the display housing. The display housing is supported by a main unit having a keyboard, and is rotatable between a closed position and an opened position. In the opened position, the display housing rises from the main unit, and the antenna is located on an upper end of the display housing. Thereby, the antenna is held in the unobstructed state.

In recent portable computers, thinning of display housings has been promoted to enhance their portabilities. To achieve thinning of a display housing, the display housing is preferably formed of metal such as magnesium alloy. This can secure the strength of the display housing, while the display housing is thinned.

However, if a display housing is formed of metal, the antenna is surrounded by a conductor. Consequently, the radiation field from the antenna is obstructed by the display housing, and it is impossible to achieve a good antenna radiation characteristic.

Jpn. Pat. Appln. KOKAI Pub. Nos. 2002-196837 and 2002-232220 disclose a portable computer in which an antenna is contained inside a metal display housing. In the computer, an opening is formed in a part of the display housing corresponding to the antenna. The opening is covered with a nonconductive cover such as a synthetic resin. This prevents obstruction to the radiation field from the antenna, and deterioration in the radiation characteristic of the antenna.

However, in the above structure, a hole is bored in the display housing, and the cover made of synthetic resin also serves as a part of the display housing. This inevitably reduces the strength of the display housing.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention is explained below on the basis of FIGS. 1 to 8.

Figure 1:
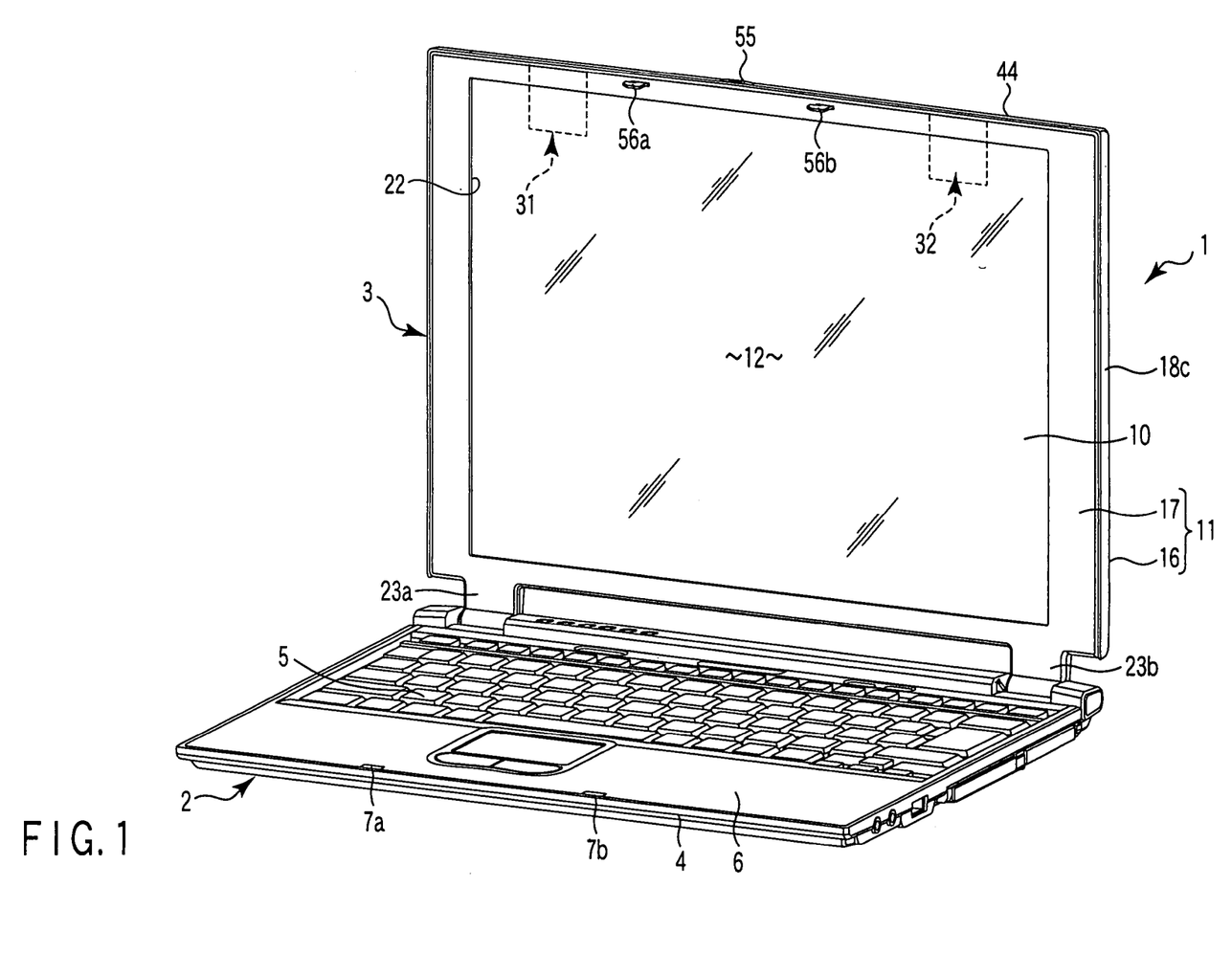
FIG. 1 is a perspective view of a portable computer according to an embodiment of the present invention.

FIG. 1 discloses a portable computer 1 serving as an electronic apparatus of the present invention. The portable computer 1 comprises a main unit 2 and a display unit 3. The main unit 2 has a first housing 4 having a flat box shape. The first housing 4 supports a keyboard 5 and contains a printed circuit board (not shown). The first housing 4 has a palm rest 6 on its upper surface. The palm rest 6 is located in front of the keyboard 5. A pair of engaging holes 7a and 7b are formed in a front end portion of the palm rest 6. The engaging holes 7a and 7b are apart from each other in the width direction of the first housing 4.

Figure 2:
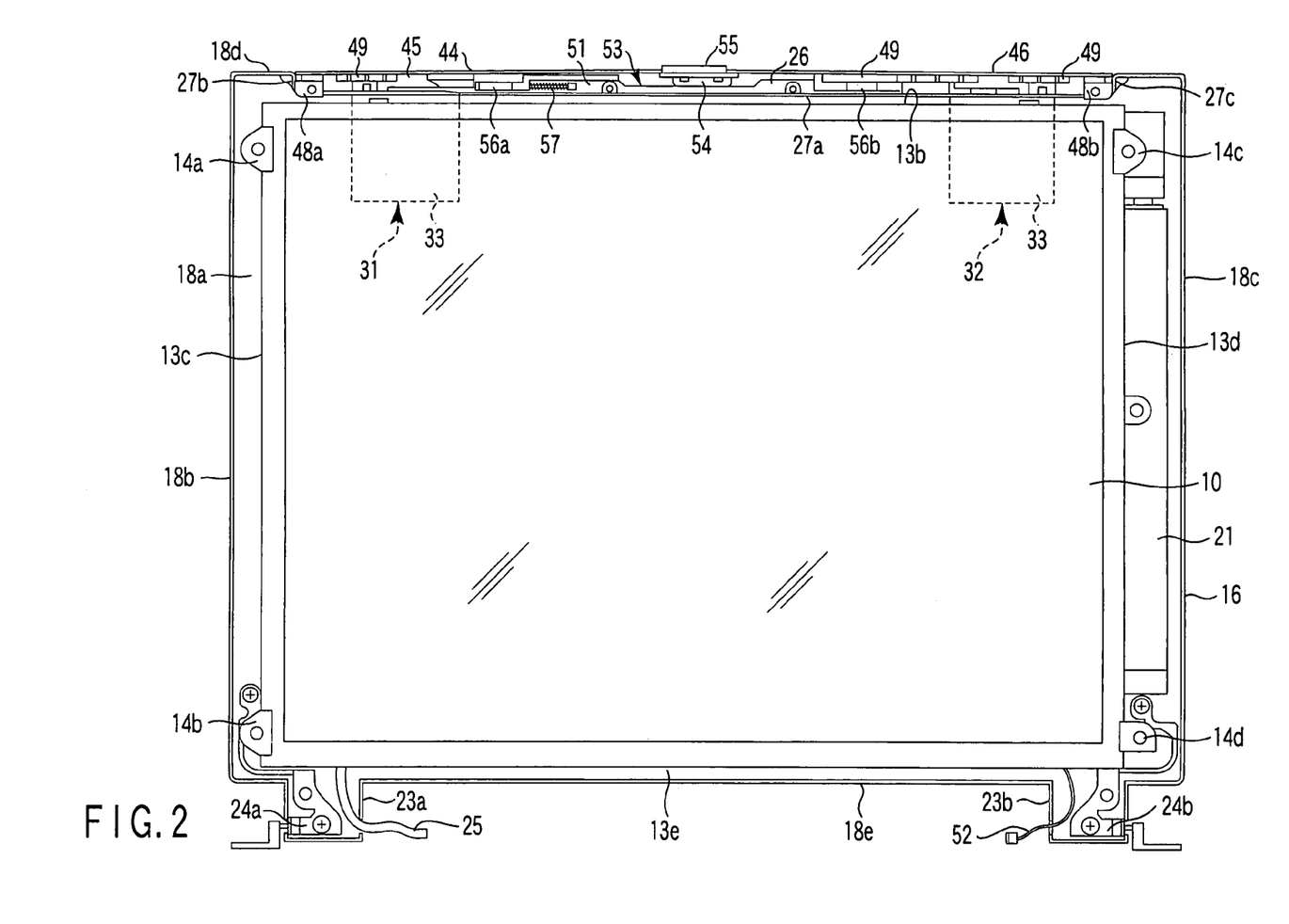
FIG. 2 is a plan view of a display unit according to the embodiment of the present invention, illustrating a positional relationship between a display cover and a liquid crystal display panel fixed on the display cover.

The display unit 3 has a liquid crystal display panel 10, and a display housing 11 serving as a second housing. As shown in FIG. 2, the liquid crystal display panel 10 has a flat rectangular form. The liquid crystal display panel 10 has a screen 12 which displays information, a back surface 13a, an upper end surface 13b, left and right side surfaces 13c and 13d, and a lower end surface 13e. The back surface 13a is located on the back side of the screen 12. The upper end surface 13b is located above the screen 12. The side surfaces 13c and 13d are located on the left side and the right side, respectively, of the screen 12. The lower end surface 13e is located under the screen 12. The back surface 13a, the upper end surface 13b, the side surfaces 13c and 13e and the lower end surface 13e are formed of a conductor such as metal.

The liquid crystal display panel 10 has first to fourth fixing pieces 14a to 14d. The first and second fixing pieces 14a and 14b project sideward from the left side surface 13c of the liquid crystal display panel 10, and are apart from each other in the height direction of the liquid crystal display panel 10. The third and fourth fixing pieces 14c and 14d project sideward from the right side surface 13d of the liquid crystal display panel 10, and are apart from each other in the height direction of the liquid crystal display panel 10.

Figure 3:
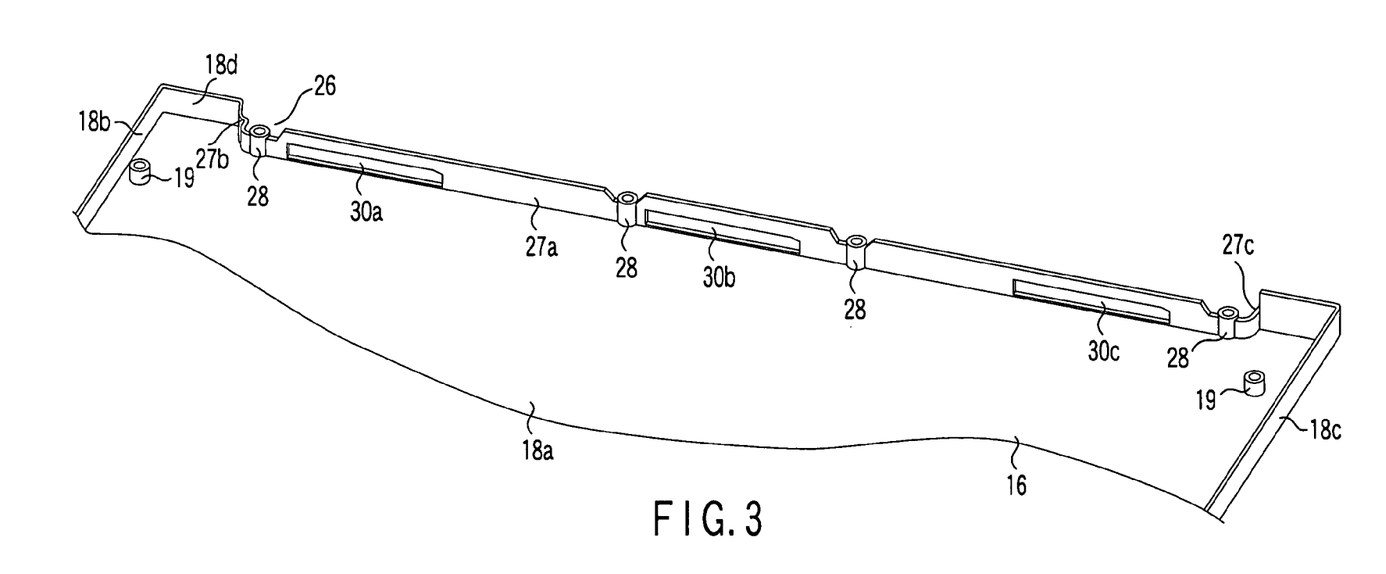
FIG. 3 is a perspective view of the display cover according to the embodiment of the present invention.
Figure 4:
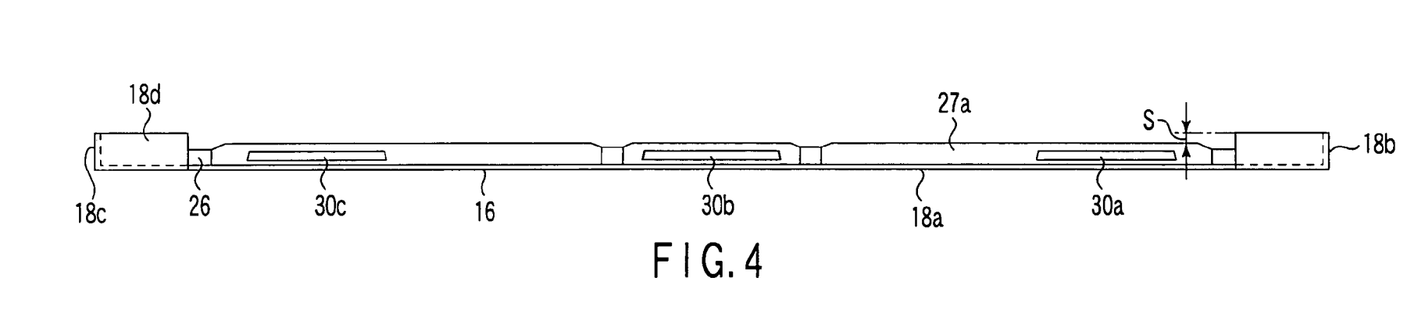
FIG. 4 is a plan view of the display cover according to the embodiment of the present invention.

The display housing 11 contains the liquid crystal display panel 10. The display housing 11 comprises a display cover 16 and a display mask 17. The display cover 16 is formed of a metal material, such as magnesium, aluminum and titanium. As shown in FIGS. 2 to 4, the display cover 16 has a support wall 18a, left and right side walls 18b and 18c, an upper wall 18d and a lower wall 18e. The support wall 18a has a rectangular plated form having a size larger than the liquid crystal display panel 10, and is opposed to the back surface 13a of the liquid crystal display panel 10. The side walls 18b and 18c, the upper wall 18d and the lower wall 18e rise from peripheral portions of the support wall 18a, and surround the liquid crystal display panel 10. More specifically, the side walls 18b and 18c are opposed to the left and right side surfaces 13c and 13d, respectively, of the liquid crystal display panel 10. The upper wall 18d is opposed to the upper end surface 13b of the liquid crystal display panel 10. The lower wall 18e is opposed to the lower end surface 13e of the liquid crystal display panel 10.

Figure 8:
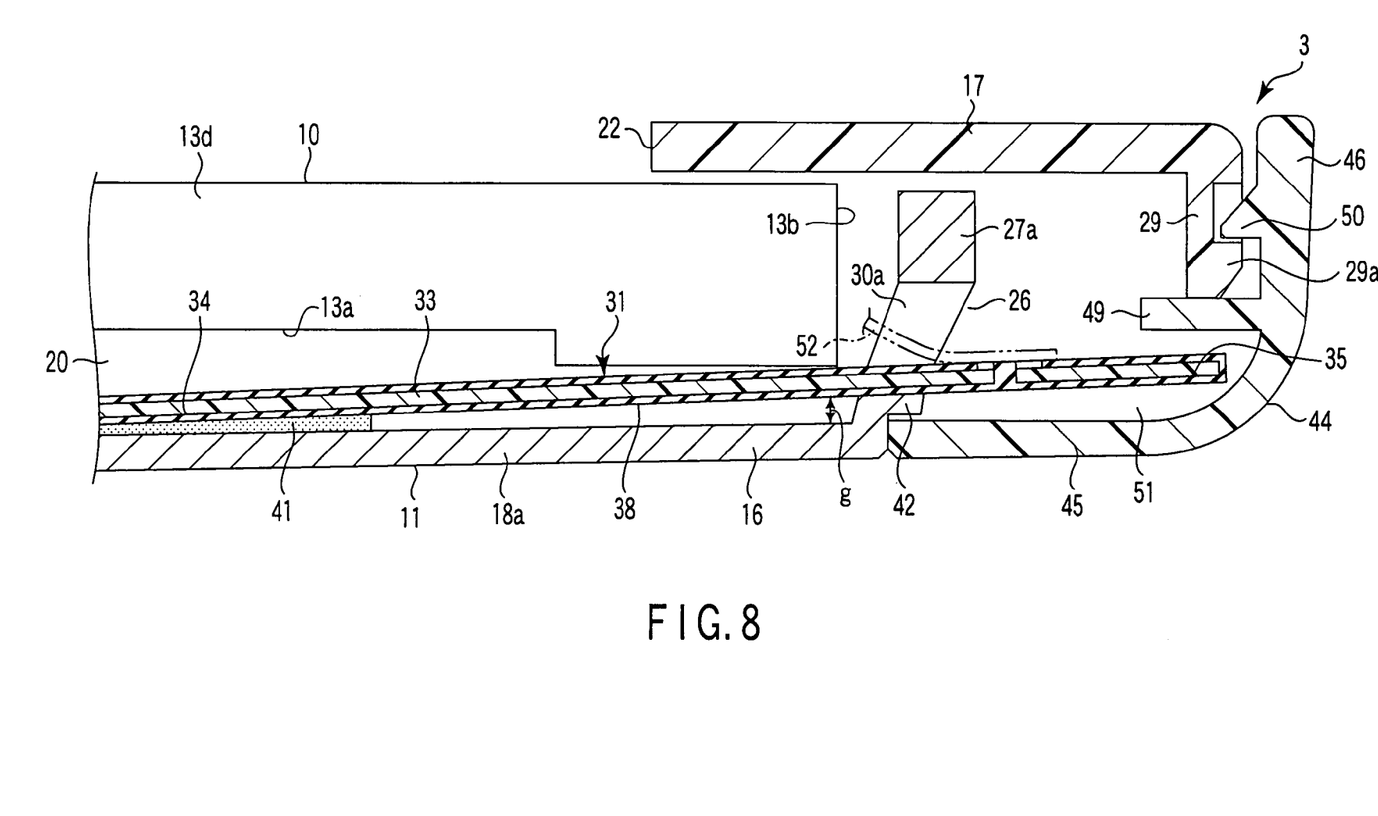
FIG. 8 is a cross-sectional view of the embodiment of the present invention, illustrating a positional relationship among a display housing, the liquid crystal display panel and the antenna board.

The support wall 18a has four boss portions 19. The boss portions 19 project from four corners of the support wall 18a so as to correspond to the respective first to fourth fixing pieces 14a to 14d of the liquid crystal display panel 10. The first to fourth fixing pieces 14a to 14d are fixed on the distal ends of the respective boss portions 19 with screws. Thereby, the liquid crystal display panel 10 is supported on the support wall 18a as shown in FIGS. 2 and 8. The back surface 13a of the liquid crystal display panel 10 is apart from the support wall 18a. A space 20 serving as a first region is provided between the back surface 13a and the support wall 18a.

As shown in FIG. 2, a drive circuit 21 is contained inside the display cover 16. The drive circuit 21 drives the liquid crystal display panel 10, and is electrically connected to the liquid crystal display panel 10. The drive circuit 21 is interposed between the right side wall 18c of the display cover 16 and the right side surface 13d of the liquid crystal display panel 10.

The display mask 17 is formed of a nonconductive synthetic resin material. The display mask 17 is fitted into an opening defined by the side walls 18b and 18c, the upper wall 18d and the lower wall 18e of the display cover 16. The display mask 17 covers the liquid crystal display panel 10 and the drive circuit 21, in cooperation with the display cover 16. The display mask 17 has an opening 22 which exposes the screen 12 of the liquid crystal display panel 10.

The display housing 11 has a pair of leg portions 23a and 23b. The leg portions 23a and 23b project from a lower end of the display housing 11 and apart from each other in the width direction of the display housing 11. The leg portions 23a and 23b are connected to a rear end portion of the first housing 4 with hinge devices 24a and 24b, respectively. Thereby, the display housing 11 is rotatable between a closed position and an opened position. In the closed position, the display housing 11 lies on the first housing 4, and covers the keyboard 5 and the palm rest 6. In the opened position, the display housing 11 rises from the rear end portion of the first housing 4. When the display housing 11 is rotated to the opened position, the keyboard 5, the palm rest 6 and the screen 12 are exposed to the outside of the portable computer 1, and the upper wall 18d of the display cover 16 is positioned on the upper end of the display housing 11.

A cable 25 is connected to the liquid crystal display panel 10. The cable 25 is guided into the left leg portion 23a through a space between the back surface 13a of the liquid crystal display panel 10 and the support wall 18a of the display cover 16. The cable 25 is guided from the leg portion 23a into the first housing 4, and electrically connected to the printed circuit board contained in the first housing 4.

Figure 6:
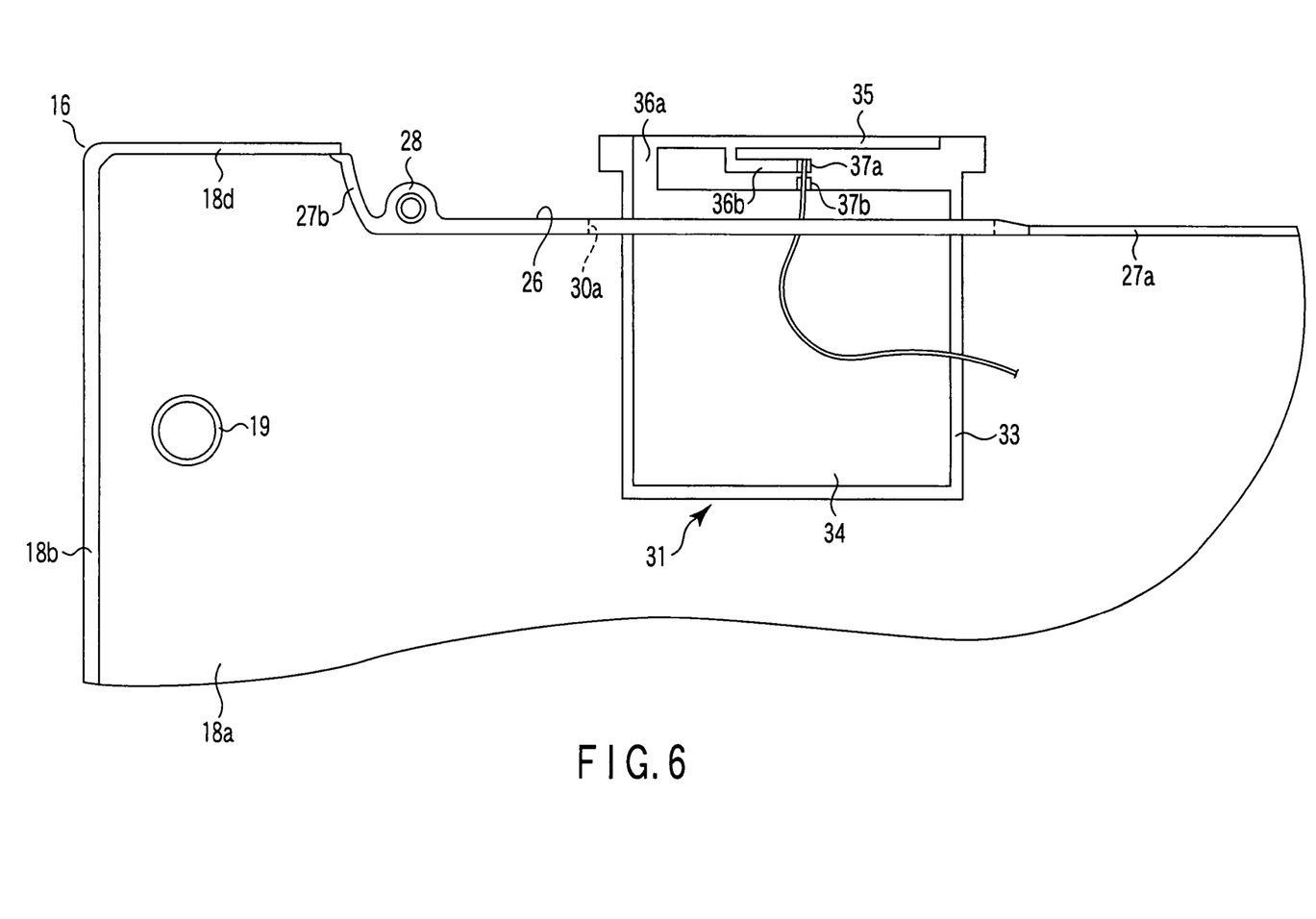
FIG. 6 is a plan view of the embodiment of the present invention, illustrating a state where the antenna board is attached to the display cover.

As shown in FIGS. 3 and 6, the upper wall 18d of the display cover 16 has a depressed portion 26. The depressed portion 26 is depressed inward the display cover 16. The depressed portion 26 is defined by a bottom wall 27a and a pair of connecting walls 27b and 27c. The bottom wall 27a runs along the width direction of the display cover 16, and is opposed to the upper end surface 13b of the liquid crystal display panel 10. One connecting wall 27b extends over a left end portion of the bottom wall 27a and the upper wall 18d. The other connecting wall 27c extends over a right end portion of the bottom wall 27a and the upper wall 18d. Therefore, the connecting walls 27b and 27c are opposed to each other, and run in the height direction of the display cover 16.

The bottom wall 27a and connecting walls 27b and 27c rise from the supporting wall 18a of the display cover 16. As shown in FIG. 4, the bottom wall 27a and the connecting walls 27b and 27c are slightly lower than the upper wall 18d. The top of the bottom wall 27a and the tops of the connecting walls 27d and 27c are located on the same plane. A step S exists between the tops of the 27a to 27c and the top of the upper wall 18d. The upper end portion of the display mask 17 enters the step S. The bottom wall 27a has a plurality of boss portions 28. The boss portions 28 are arranged apart from one another in the width direction of the display cover 16. The display mask 17 is fixed on distal ends of the boss portions 28 by screws.

As shown in FIG. 8, the display mask 17 has an engaging wall 29 in a position corresponding to the depressed portion 26 of the display cover 16. The engaging wall 29 hangs from an upper end of the display mask 17 inward towards the depressed portion 26. A first hooks 29a are formed on a distal end portion of the engaging wall 29.

As shown in FIGS. 3, 4 and 8, the bottom wall 27a of the depressed portion 26 has first, second and third through holes 30a, 30b and 30c. Each of the first to third through holes 30a, 30b and 30c has a slit shape extending along the width direction of the display cover 16, and arranged in a line at intervals in the width direction of the display cover 16. The first to third through holes 30a, 30b and 30c are opposed to the space 20 located between the display cover 16 and the liquid crystal display panel 10.

As shown in FIGS. 1 and 2, the display housing 11 contains two antenna boards 31 and 32 for radio LAN. The antenna boards 31 and 32 function as antennas of diversity system, and are apart from each other in the width direction of the display housing 11. The antenna boards 31 and 32 have the same structure, and thus the structure of one antenna board 31 is explained as representative.

Figure 5:
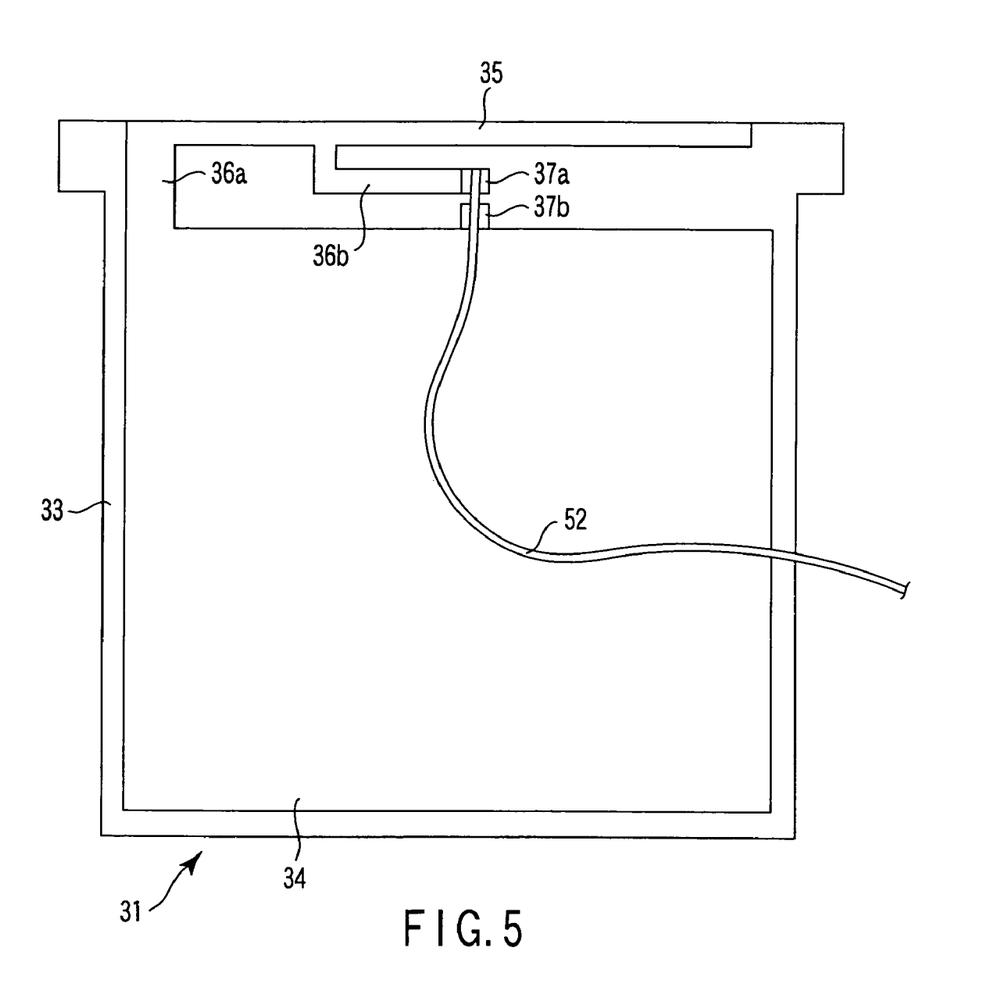
FIG. 5 is a plan view of an antenna board according to the embodiment of the present invention.

As shown in FIG. 5, the antenna board 31 has a flat-shaped main body 33. A ground portion 34 and an antenna portion 35 are formed on the main body 33. The ground portion 34 has a pattern extending over almost the whole surface of the main body 33. The antenna portion 35 is located on one end of the main body 33, and extending in a straight line in the width direction of the main body 33. The antenna portion 35 is electrically connected to the ground portion 34 via a first conductor portion 36a. The antenna portion 35 has a second conductor portion 36b branched from its middle portion. The second conductor portion 36b is located between the antenna portion 35 and the ground portion 34, and has a first connecting pattern 37a on its distal end. Further, the ground portion 34 has a second connecting pattern 37b adjacent to the first connecting pattern 37a. The width of the ground portion 34 and the length of the antenna portion 35 are set according to the dielectric constant and the radiation characteristic of the antenna board 31.

The main body 33 of the antenna board 31 is coated with an electrical-insulating film 38 (shown in FIG. 8). The film 38 coats the ground portion 34, the antenna portion 35, and the first and the second conductor portions 36a and 36b. The first and the second connecting patterns 37a and 37b are exposed to the outside of the antenna board 31, without being coated with the film 38.

As shown in FIG. 6, the one antenna board 31 is inserted into the display cover 16 through the first through hole 30a. The first through hole 30a is located in a left end portion of the depressed portion 26. The other antenna board 32 is inserted into the display cover 16 through the third through hole 30c. The third through hole 30c is located in a right end portion of the depressed portion 26. The second through hole 30b located in the central portion of the depressed portion 26 is used in adding an antenna board based on another communication standard, such as short-range radio communication system.

Figure 7:
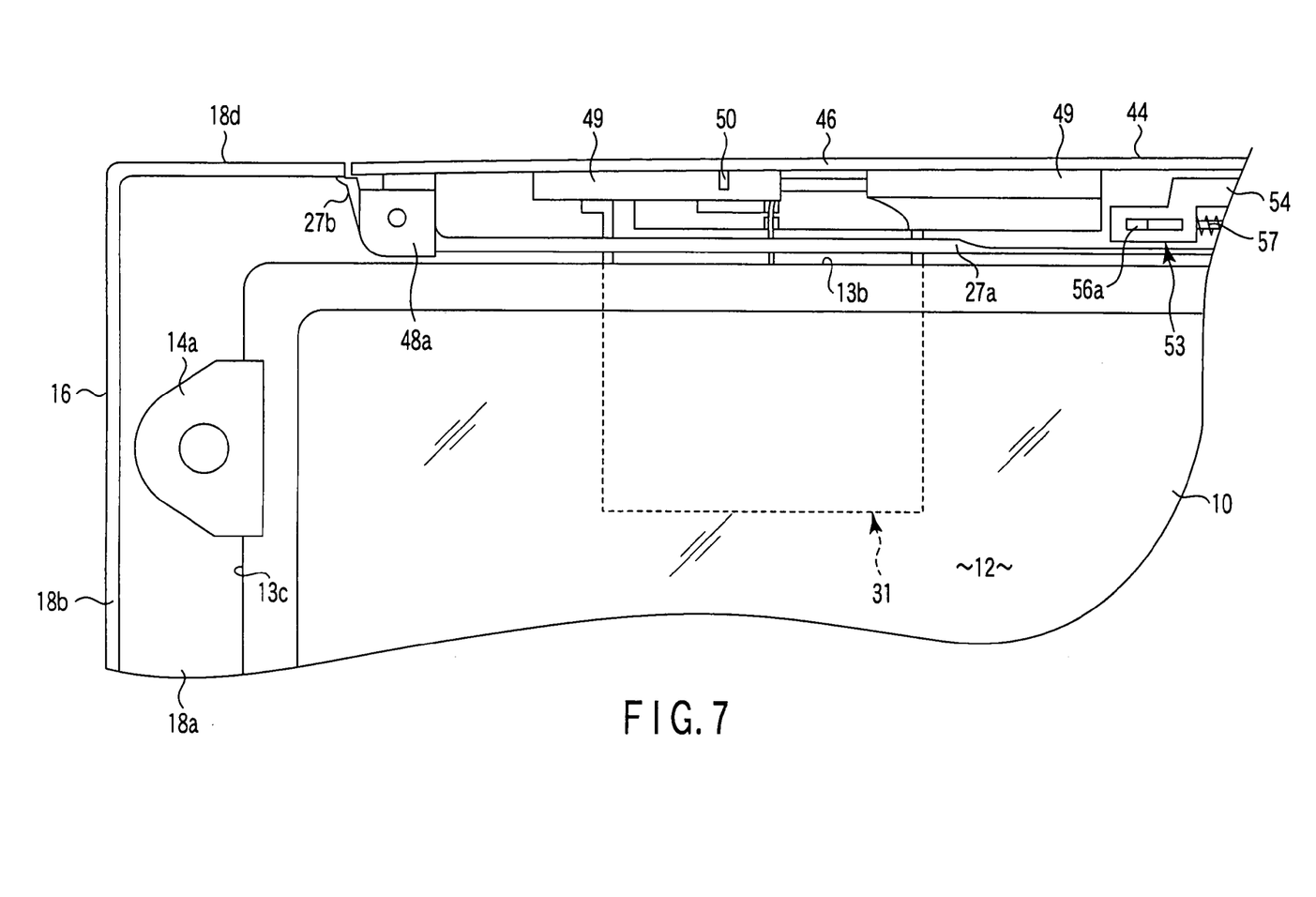
FIG. 7 is a plan view of the embodiment of the present invention, illustrating a state where the liquid crystal display panel, a cover and the antenna board are attached to the display cover.

FIGS. 6 to 8 disclose a state in which the one antenna board 31 is fixed into the display cover 16. The other antenna board 32 is fixed into the display cover 16 in the same manner as the antenna board 31. Therefore, in this embodiment, explained is a structure for fixing the antenna board 31 into the display cover 16.

As shown in FIG. 8, the ground portion 34 of the antenna board 31 is disposed in the space 20 between the liquid crystal display panel 10 and the display cover 16 through the first through hole 30a, and opposed to the supporting wall 18a of the display cover 16. In other words, the ground portion 34 of the antenna board 31 and the liquid crystal display panel 10 have such a positional relationship that they overlap inside the display housing 11 in the thickness direction of the housing 11. As a result, a front surface of the ground portion 34 is covered with the metal back surface 13a of the liquid crystal display panel 10. In the same manner, the back surface of the ground portion 34 is covered with the metal display cover 16. The back surface of the ground portion 34 is adhered to the supporting wall 18a of the display cover 16, via a bonding member 41 such as an adhesive or a double-faced tape. The bonding member 41 is interposed between one end portion of the back surface of the ground portion 34 and the supporting wall 18a.

The antenna board 31 is in contact with an opening edge of the first through hole 30a. A rise portion 42 being a part of the bottom wall 27a is interposed between the opening edge of the first through hole 30a and the supporting wall 18a. Therefore, a space g corresponding to the height of the rise portion 42 is provided between the ground portion 34 and the supporting wall 18a. Consequently, in cooperation with the bonding member 41, the space g renders the ground portion 34 of the antenna board 31 apart from the supporting wall 18a, and achieves a good antenna performance.

As shown in FIGS. 6 and 8, the antenna portion 35 of the antenna board 31 projects to the inside of the depressed portion 26 through the first through hole 30a. In other words, the antenna portion 35 pierces through the bottom wall 27a of the depressed portion 26, and projects to the outside of the display cover 16. The antenna portion 35 is maintained in a state where it is open to the forward, rearward and upward directions of the display cover 16.

In this embodiment, the antenna portion 35 of the antenna board 31 passes through the first hole 30a formed in the bottom wall 27. However, the member through which the antenna portion 35 passes is not limited to a hole. For example, instead of the hole, a notch or a slit through which the antenna portion 35 passes may be formed in the bottom wall 27a.

An antenna cover 44 is attached to the depressed portion 26 of the display cover 16. The antenna cover 44 is formed of a synthetic resin material, and is nonconductive. The antenna cover 44 has a first wall 45 and a second wall 46. The first wall 45 covers the depressed portion 26 from the rear of the display cover 16, and is opposed to the upper end portion of the display mask 17. The second wall 46 covers the depressed portion 26 from above of the display cover 16, and is opposed to the bottom wall 27a of the depressed portion 26.

As shown in FIGS. 2, 7 and 8, the second wall 46 of the antenna cover 44 has a pair of fixing pieces 48a and 48b, a plurality of receiving portions 49 and a plurality of second hooks 50. The fixing pieces 48a and 48b project toward the two boss portions 28 located on the left end and the right end of the bottom wall 27a. The fixing pieces 48a and 48b are interposed between the respective boss portions 28 and the display mask 17, and fixed onto the respective boss portions 28 by screws. The receiving portions 49 are arranged in a line at intervals between the fixing pieces 48a and 48b. The receiving portions 49 project above the antenna portion 35 of the antenna board 31, and receive the distal ends of the engaging wall 29 of the display mask 17. The second hooks 50 are hooked onto the respective first hooks 29a of the engaging wall 29. Therefore, the antenna cover 44 extends over the display cover 16 and the display mask 17, and covers the depressed portion 26.

When the depressed portion 26 is covered with the antenna cover 44, the first wall 45 is located on the same plane as the supporting wall 18a of the display cover 16. In the same manner, the second wall 46 is located on the same plane as the upper wall 18d of the display cover 16. Therefore, the antenna cover 44 forms an antenna containing chamber 51 as a second region, in cooperation with the depressed portion 26 and the display mask 17. The antenna portion 35 of the antenna board 31 is contained in the antenna containing chamber 51. In other words, the antenna board 31 is held by the display cover 16 so as to range from the space 20 inside the display cover 16 to the antenna containing chamber 51.

As shown in FIG. 5, a coaxial cable 52 is electrically connected to the antenna board 31. The coaxial cable 52 has an inner conductor and an outer conductor. One end of the inner conductor is electrically connected to the first connecting pattern 37a of the antenna board 31 by soldering or the like. One end of the outer conductor is electrically connected to the second connecting pattern 37b of the antenna board 31 by soldering or the like.

As shown in FIG. 8, connecting portions between the coaxial cable 52 and the antenna board 31 are located in the antenna containing chamber 51. The coaxial cable 52 is guided into the display cover 16 through the first through hole 30a. Further, the coaxial cable 52 is guided into the right leg portion 23a, through the space between the liquid crystal display panel 10 and the supporting wall 18a of the display cover 16. The coaxial cable 52 is guided from the leg portion 23b into the first housing 4, and electrically connected to the printed circuit board contained in the first housing 4.

The antenna cover 44 has a latch mechanism 53. The latch mechanism 53 holds the display unit 3 in the closed position. The latch mechanism 53 has a slider 54 and an operation lever 55. The slider 54 is held inside the antenna cover 44. The slider 54 has a pair of latch pieces 56a and 56b. The latch pieces 56a and 56b project from the display mask 17, and arranged apart from each other so as to correspond to the engaging holes 7a and 7b, respectively, of the palm rest 6.

The slider 54 is slidable between a locked portion, in which the latch pieces 56a and 56b are hooked onto the opening edges of the engaging holes 7a and 7b, respectively, when the display unit 3 is rotated to the closed position, and an unlocked position in which the latch pieces 56a and 56b are released from the opening edges of the engaging holes 7a and 7b. The slider 54 is pressed toward the locked position via a spring 57.

The operation lever 55 is used for hooking the operator's fingers thereon when the slider 54 is slid from the locked position to the unlocked position. The operation lever 55 is connected to the slider 54, and exposed to the outside of the antenna cover 44. Therefore, if the slider 54 is slid from the locked position to the unlocked position by using the operation lever 55 if the display unit 3 is locked in the locked position, the latch pieces 56a and 56b are released from the engaging holes 7a and 7b. Thereby, the display unit 3 is unlocked, and the display unit 3 can be rotated from the closed position to the opened position.

According to the portable computer 1 having the above structure, the antenna portions 35 of the antenna boards 31 and 32 project from the first and third through holes 30a and 30c to the outside of the metal display cover 16. Therefore, the whole display cover 16 supporting the liquid crystal display panel 10 can be formed of metal, although the antenna boards 31 and 32 are contained inside the display cover 16. This ensures a sufficient strength of the display cover 16, and prevents deformation of the display cover 16.

Further, the antenna portion 35 projecting into the depressed portion 26 of the display cover 16 is covered with the nonconductive display mask 17 and the nonconductive antenna cover 44. Therefore, the radiation field from the antenna portion 35 is not obstructed. This achieves good radiation fields of the antenna boards 31 and 32, while the stiffness of the display housing 11 is maintained.

The electronic apparatus according to the present invention is not limited to portable computers. For example, the present invention can be applied to other information apparatuses, such as PDAs (Personal Digital Assistants) and digital cameras.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main unit;
   a display housing supported by the main unit, the display housing including a supporting wall and an upper wall;
   a display panel contained in the display housing, the display panel having a back surface facing to the supporting wall of the display housing;
   a radio communication antenna board contained in the display housing and interposed between the back surface of the display panel and the supporting wall, the antenna board having an antenna portion which projects outside the display housing and pierces through the upper wall; and
   a nonconductive cover attached to the upper wall of the display housing and covering the antenna portion of the antenna board.

2. The electronic apparatus according to claim 1, wherein the upper wall has a depressed portion depressed inside the display housing, the depressed portion has a bottom in which a through hole is formed, and the antenna board passes through the through hole.

3. The electronic apparatus according to claim 2, wherein the display housing includes a metal display cover having the upper wall and the supporting wall, and a nonconductive display mask covering the display panel located between the display cover and the display mask, the depressed portion is formed in the display cover, and the antenna portion of the antenna board is located in a region surrounded by the display mask and the nonconductive cover.

4. The electronic apparatus according to claim 1, wherein the nonconductive cover has a first wall connecting with the supporting wall, and a second wall connecting with the upper wall.

5. The electronic apparatus according to claim 3, wherein the antenna board has a ground portion, and the ground portion is located between the supporting wall and the back surface of the display panel.

6. The electronic apparatus according to claim 5, wherein the antenna board has a cable which is electrically connected to the antenna portion and the ground portion, and the cable is guided from the region surrounded by the display mask and the nonconductive cover into the display housing through the through hole.

7. The electronic apparatus according to claim 5, wherein the ground portion of the antenna board is apart from the supporting wall.

8. The electronic apparatus according to claim 1, wherein the display housing is rotatable between a closed position in which the display housing lies on the main unit, and an opened position in which the display housing rises from the main unit, and the antenna board is located on an upper end of the display housing when the display housing is rotated to the opened position.

9. The electronic apparatus component comprising:
   a main unit;
   a display cover supported by the main unit, the display cover having a supporting wall and an upper wall in which a through hole is formed;
   a display panel supported by the supporting wall of the display cover, the display panel having an upper end portion opposed to the upper wall and a screen located on a side reverse to a side facing the supporting wall;
   a display mask attached to the display cover, the display mask covering the display panel in cooperation with the display cover and having an opening which exposes the screen;
   a nonconductive cover attached to the upper wall of the display cover, the nonconductive cover forming a containing chamber, to which the through hole is opened, together with the upper wall and the display mask; and
   a radio communication antenna board contained in the display cover, the antenna board having at one end an antenna portion, the antenna portion projecting to the containing chamber through the through hole.

10. The electronic apparatus according to claim 9, wherein the display cover is formed of metal, the display mask and the nonconductive cover are formed of synthetic resin.

11. The electronic apparatus according to claim 10, wherein the antenna board has a ground portion, and the ground portion is located between the supporting wall and the display panel.

12. The electronic apparatus according to claim 11, wherein the ground portion of the antenna board is apart from the supporting wall.

13. The electronic apparatus according to claim 9, wherein the antenna board has a cable which is electrically connected to the antenna portion and the ground portion, and the cable is guided from the containing chamber into the display cover through the through hole.

14. An electronic apparatus comprising:
a first housing;
a second housing supported by the first housing;
a display panel contained in the second housing and having a screen; and
a radio communication antenna board contained in the second housing,
wherein the second housing comprises:
a display cover including a supporting wall which supports the display panel and defines a first region between the display cover and the display panel, an upper wall which is located above the display panel, and a depressed portion which is provided on the upper wall and has a through hole opened in the second housing;
a display mask attached to the display cover, the mask covering the display panel in cooperation with the display cover and having an opening which exposes the screen; and
a nonconductive cover which extends over the display cover and the display mask and covers the depressed portion, the cover defining a second region, to which the through hole is opened, between the cover and the display mask, and
the antenna board extends over the first region and the second region through the through hole, and has an antenna portion located in the second region.

15. The electronic apparatus according to claim 14, wherein the display cover is formed of metal, and the display mask and the nonconductive cover are formed of synthetic resin.

16. The electronic apparatus according to claim 15, wherein the antenna board has a ground portion, and the ground portion is located in the first region.

17. The electronic apparatus according to claim 14, wherein the second housing is rotatable between a closed position in which the second housing lies on the first housing and an opened position in which the second housing rises from the first housing, and the antenna board is located on an upper end of the second housing when the second housing is rotated to the opened position.

* * * * *